Figure 1:
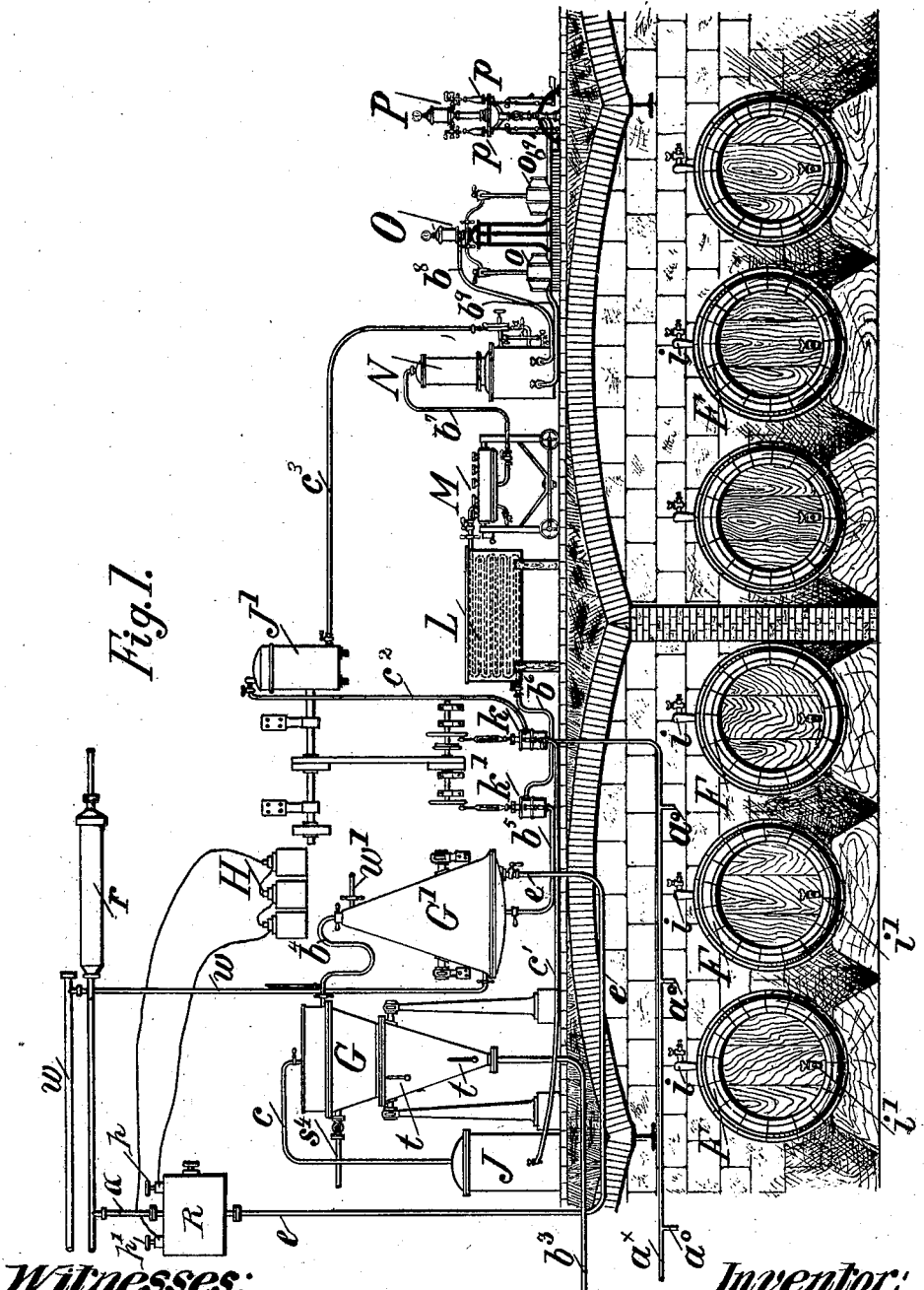

(No Model.) 3 Sheets—Sheet 1.

G. H. SCHNEIDER.
BREWING BEER.

No. 503,168. Patented Aug. 15, 1893.

Witnesses:
H. G. Dieterich
O. H. Sommers.

Inventor:
Gustav H. Schneider,
By [signature]
Atty.

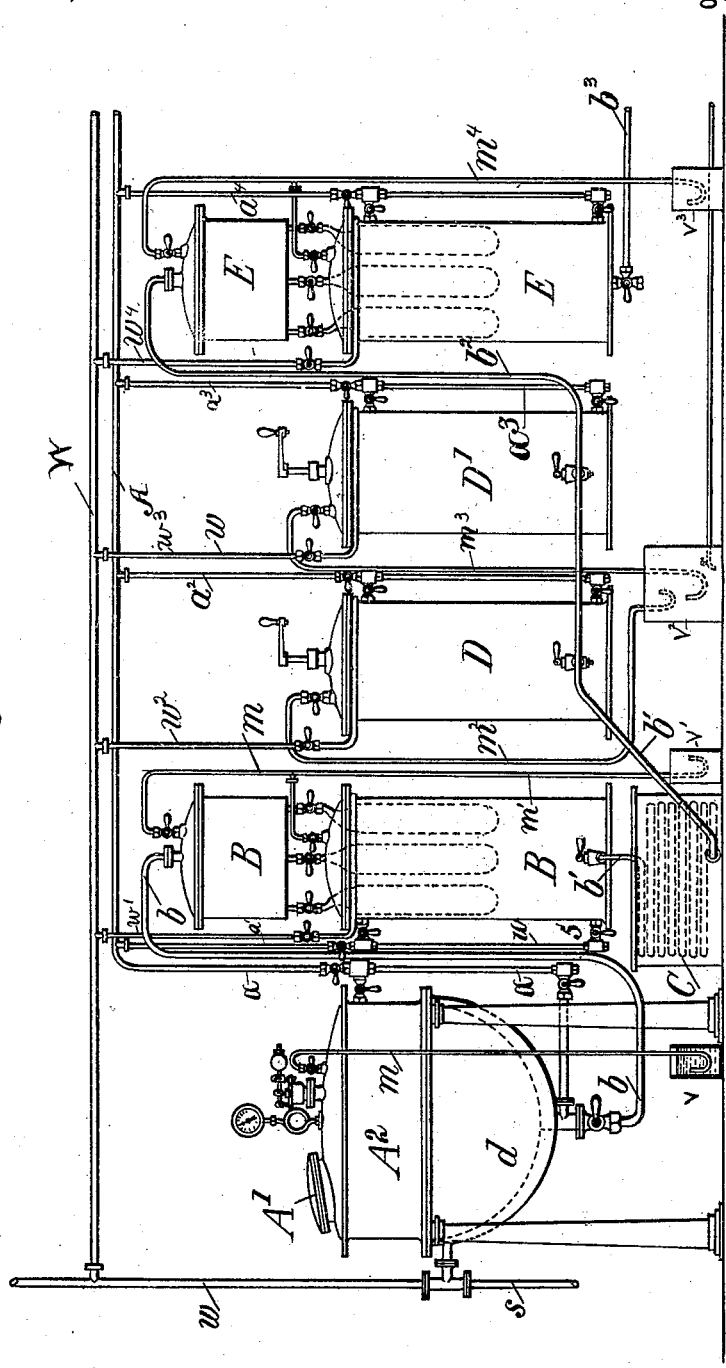

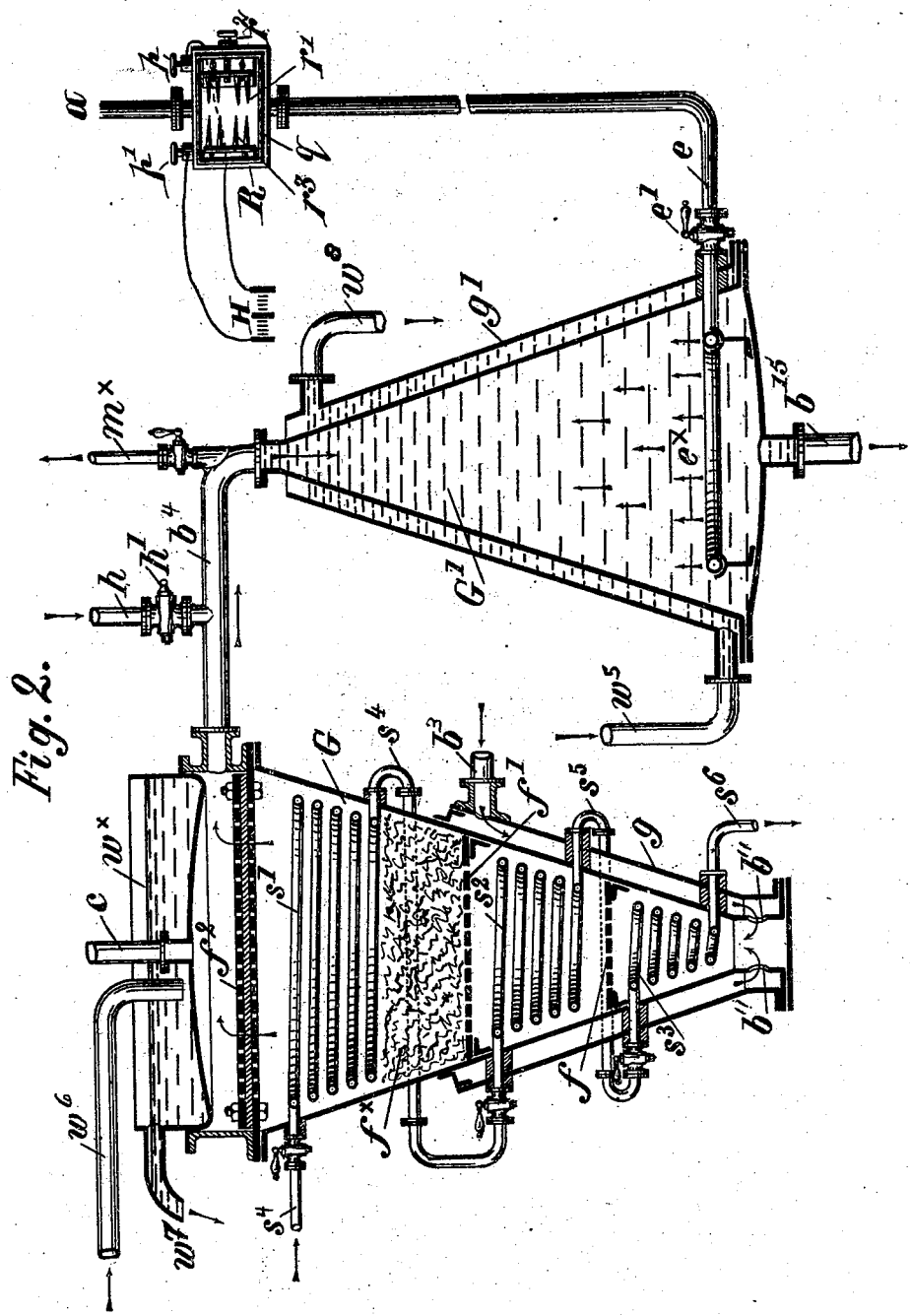

UNITED STATES PATENT OFFICE.

GUSTAV HERMANN SCHNEIDER, OF HAMBURG, GERMANY.

BREWING BEER.

SPECIFICATION forming part of Letters Patent No. 503,168, dated August 15, 1893.

Application filed July 23, 1892. Serial No. 441,010. (No model.) Patented in France April 21, 1890, No. 205,165, and June 9, 1891; in England April 28, 1890, No. 6,480, and in Germany April 17, 1891, No. 58,993.

*To all whom it may concern:*

Be it known that I, GUSTAV HERMANN SCHNEIDER, a subject of the German Emperor, residing at Hamburg, in the German Empire, have invented certain new and useful Improvements in Brewing Beer, (for which I have obtained patents in Germany, No. 58,993, dated April 17, 1891; in France, No. 205,165, dated April 21, 1890, and June 9, 1891, and in England, No. 6,480, dated April 28, 1890,) of which the following is a specification.

My invention has relation to the art of brewing beer from the wort, and it has for its object the provision of means whereby a product is obtained whose nutritive properties are materially increased, that is not as liable to secondary fermentation and that will keep in good condition for a longer time than beer brewed in the usual way.

One of the advantages of my invention lies in the fact that the fermentation may be interrupted at any time, thereby enabling the brewer to vary the percentage of alcohol in the beer, according to requirements, and consequently preserve to the beer a larger percentage of extracts than has been possible heretofore.

A further advantage of my said invention consists in obviating the cellar storage otherwise necessary, and in cheapening considerably the production of beer, notwithstanding that a product is obtained of a taste far more agreeable than that obtained by the old process.

I attain these objects by adding hops to the wort, boiling the same by means of steam under pressure, cooling the boiled wort, filtering, and subjecting the filtered wort to a yeast fermentation, pasteurizing the fermented liquid by means of heat, cooling it down, and aerating it by means of ozonized air, and finally charging the sterilized liquid with carbonic acid, when the beer will be ready for storage, these operations, and the storage being successively carried out under exclusion of ambient atmospheric air, the liquid being forced through the various apparatuses, and finally to the receiver, by means of sterilized air. But that my invention may be fully understood, I will describe the same in detail, reference being had to the accompanying drawings, in which—

Figures 1 and $1^a$ show in side elevation a plant by means of which my invention may be carried out, and Fig. 2 is a sectional elevation of my improved pasteurizing and aerating apparatus.

$A^2$, is a boiler, into which the wort is introduced through opening $A'$, which is closed during the boiling process. In this boiler, the wort is boiled with the hops, by introducing steam through the pipe $s$ into the space between the double bottom $d$. After boiling, the product is cooled down by cold water, which enters, instead of the steam, through the pipe $w$ underneath the double bottom, said pipe $w$ being connected with a water supply main W. After the cooling has taken place, the liquid is transferred from the boiler $A^2$, to the filter B, by atmospheric pressure through the pipe $a$ that is connected with an air supply main A, the air having been filtered through sterile cotton interposed in said main, Fig. $1^a$, and sterilized, so that by regulating the respective cocks, the liquid is conducted through the pipe $b$ into the filter B. From the filter B, the liquid under the pressure of the sterile air above referred to, passes by way of pipe $b'$, through the cooler C, into the fermentation vessels, D, and $D'$, where it is fermented with pure yeast, and then through pipe $b^2$ into a second filter E to be again filtered.

As shown in Fig. $1^a$, the filters B, E, as well as the fermenting vessels, D, and $D'$, are connected with the air supply main A, by means of branch pipes $a'$, $a^4$, and $a^2$, $a^3$, respectively, and with the water main W, by means of branch pipes $w'$, $w^4$, and $w^2$, $w^3$ respectively, whereby air may be supplied to these devices should the pressure in the boiler be insufficient, or after a charge of wort has been expelled therefrom, and whereby water under pressure may be supplied to these devices for the purpose of cleansing the same. This filtered liquid is now forced through the pipe $b^3$ into the vessel G of the pasteurizing and aerating apparatus G, $G'$, by the aid of compressed sterilized air entering the lower vessel of the filter E, through the pipe $a^4$.

Within the jacket surrounding the lower part of the vessel G, the beer, produced as described, is then gradually heated to a pasteurizing temperature by means of steam supplied from steam main $s$ Figs. 1 and $1^a$, to the coiled tubes, $s^3$, $s^2$, $s'$, said gradual heating taking place as the beer rises within the vessel G, which has the form of an inverted cone.

In order that the temperature of the beer within the vessel G may be ascertained, thermometers $t,t$ are provided at different heights of the same. The carbonic acid expelled from the beer under the influence of the heat, passes through the pipe $c$, into the reservoir J, from whence it is drawn through a pipe $c'$ by means of a pump K, and forced by the latter through a pipe $c^2$ into the high pressure reservoir J'. The beer thus pasteurized, is conducted through the pipe $b^4$, at the upper part of the vessel G, into the conical vessel G'. The latter is double walled, a cooling agent, as cold water, being caused to flow through the annular space thus formed, the water entering the annular space at its lower end through pipe $w^5$ connected with the water main W, and passing out of said space at the upper narrow end through the pipe $w^6$, so that the beer is subjected to a preliminary cooling. At the same time, the beer within the vessel G', is treated with ozonized air by ozonizing the sterile air from service main A by means of electricity, as will be more fully described hereinafter. The object of ozonizing the air is to relieve the beer of the bread-like taste imparted thereto while being heated in the vessel G, and the object of previously sterilizing the air is to guard against the introduction into the beer of germs liable to produce fermentation.

From the vessel G' the beer is drawn through the pipe $b^5$ by means of the pump $k'$ and forced through the pipe $b^6$ into the cooler L, and after passing through the filter M said beer is forced through the pipe $b^7$ into the mixing vat N where it is charged with carbonic acid gas from reservoir J', said vat N being connected with the reservoir through the pipe $c^3$. After the pasteurized and ozonized beer has been charged with carbonic acid gas it is drawn off into barrels $o$ by the apparatus O, or bottled in bottles $p$ by the bottling and corking machine P under exclusion of the ambient atmosphere; the said apparatuses O and P being connected with the lower vessel of the filter M by pipes $b^8$ and $b^9$, respectively.

In order that the air, gases or vapors, &c., may be removed from the various vessels A, B, D, D', E, without the outer air entering the same, escape tubes $m'$, $m^2$, $m^3$, $m^4$ respectively are provided for said vessels, the discharge ends of said tubes being immersed in water contained in suitable vessels $v$, $v'$, $v^2$, $v^3$, as shown in Fig. $1^a$; or the gases or vapors may be led into a collecting receptacle from which they can be drawn off by a pump and otherwise used. From the description of the apparatus it is obvious that the fermentation of the beer may be interrupted at option, and consequently the amount of alcohol in the beer varied or regulated.

The apparatus for pasteurizing and aerating the beer with ozonized air hereinabove referred to, consists of two conical vessels G and G', (Fig. 2,) the former having its wide end, and the latter its narrow end directed upward. As above mentioned, the lower part of the vessel G is surrounded by a jacket $g$, which serves to better utilize the heat radiating from the vessel G and to warm the beer transferred through the pipe $b^3$ from the filter E or store vats F (Fig. $1^a$) by means of sterilized compressed air, before entering the vessel G.

As shown in Fig. 2, the beer forced through pipe $b^3$ passes into jacket $g$ of the vessel G, to the lower end of the latter, thence through ports $b''$ into said vessel. In the latter the beer rises in accordance with the augmentation of the area of the conical vessel, with a gradually retarded velocity, through the perforated bottoms $f$ and $f'$ and a layer $f^x$ of broken glass, along the heating coils $s^3$, $s^2$, $s'$, after which the said beer passes the layer of filtering material between the perforated top diaphragms $f^2$ and flows through the pipe $b^4$ into the aerating vessel G', from whence it is discharged through the pipe $b^{15}$ at the bottom of the vessel.

The steam for heating the beer to a pasteurizing temperature passes into the upper coil $s'$ of the vessel G from the pipe $s^4$ connected with the steam main $s$, and thence flows successively through the coils $s^2$ and $s^3$, the terminal $s^6$ of coil $s^3$ being connected with a steam trap, not shown. If desired each of said coils may be separately connected with the steam main $s$, in which case the lower end or branch $s^4$, $s^5$ $s^6$, respectively, of the several coils $s'$, $s^2$, $s^3$ is connected with a steam trap. Owing to this arrangement, the steam flows through the coils $s'$, $s^2$, $s^3$ in a direction the reverse of that of the beer within the vessel G, or from above downwardly, so that the temperature of the beer during its upward flow in vessel G is gradually raised to a pasteurizing temperature, and said beer is moreover kept a proportionally longer time in contact with the heating coils the higher it rises in the vessel. By this gradual raising of the temperature of the beer very favorable results are obtained, not only with regard to the continuous working of the pasteurizing apparatus, but also in respect of preservation of the light color of the beer and the unaffected taste of the same.

Above the filter diaphragms $f^2$ of vessel G is arranged a surface cooler $w^x$ which is constantly supplied with cold water through the pipe $w^3$ connected with the water main W; the warm water is continuously discharged through the overflow pipe $w^7$, so that the pasteurized beer before entering the pipe $b^4$ connecting the vessel G with cooler G', is subjected to a preliminary cooling. At the highest point of the somewhat bulged bottom of the cooler $w^x$ is provided an escape pipe $m^5$ through which the carbonic acid evolved from the beer during pasteurization is conducted into a collecting vessel J, from whence it is drawn in a purified state into high pressure reservoir J' and again introduced into the fully cooled beer, as above described. The beer is then further cooled in the cooling vessel G', which is surrounded by a jacket $g'$, a cooling agent being caused to circulate through the annular space formed around the vessel G, thus forming a surface cooler for the beer. Water, or any other suitable cooling agent may be employed and admitted at the lower end of the jacket through pipe $w^5$ and discharged at a considerably higher temperature through the overflow pipe $w^6$ at the upper end of said jacket.

For regulating the quantity of beer discharged from the vessel G, a stop-cock may be interposed either in pipe $b^3$ of vessel G, or in pipe $b^{15}$ of vessel G', which may be adjusted in such a manner that the vessel G' is kept entirely filled during the working of the apparatus.

For ozonizing the beer within the vessel G' a perforated annular pipe $e^x$ is arranged at the bottom of the latter, into which sterilized air is admitted through pipe $e$ from main A, which air, for reasons above stated, is preferably ozonized by means of electricity produced by the electric battery H (Fig. 1ª) the volume of air admitted to pipe $e^x$ being adjusted by a stop-cock $e'$. By reason of the conical shape of the vessel G' the jets or bubbles of sterilized and ozonized air issuing from the perforations of the annular pipe $e^x$ on rising to the narrow top of the vessel G', will come into intimate contact with the whole quantity of beer contained in and continuously fed to vessel G' the excess of air escaping through pipe $m^x$. The pipe $b^4$ that connects the vessels G, G', is connected with a branch pipe $h$ provided with a stop cock $h'$, said pipe $h$ being connected with the steam and water mains $s$ and W, respectively by means of suitable branches which I have deemed unnecessary to show, said branches being provided with suitable stop-cocks, so that either steam or water may be introduced into vessels G and G' for the purpose of cleansing the same. The beer discharged at the bottom of the vessel G' is thoroughly ripe and can be preserved, and has the taste of old lager beer, so that it may at once be drawn off or bottled, though I prefer to first charge the beer with carbonic acid gas, as above described.

The described pasteurizing and ozonizing apparatus is also applicable for treating beer brewed by any of the well-known processes, and it may therefore be used for preserving or seasoning beer which has already been stored a shorter or longer time. When the apparatus is located above a storage cellar the beer may be transferred from the vats F (Fig. 1ª) into the vessel G by means of sterilized air under pressure entering the vats through suitable bungs $i$, which may be connected to the air pipe $a^x$, by means of flexible tubes attached to suitable nipples or coupling branches $a^x$, of said air pipe. The beer is preferably conducted to vessel G through like flexible tubes connected to the faucets $i'$ of vats F.

Any suitably constructed apparatus for producing ozone by electricity may be employed; in Fig. 2 I have shown an ozonizer consisting of a casing wherein are arranged a set of fixed needle conductors $r^3$ and a set of movable needle conductors $r'$, the support of the latter being adjustable by means of a set screw $r^2$, toward and from the fixed needle support and its needles, for purposes well understood. $p, p'$ are the binding posts that connect the needle supports with the plus and minus poles of a suitable generator of electricity H, the ozonizer being interposed in the pipe $e$ that supplies sterilized air to vessel G' from air main A, as shown in Fig. 1ª.

Having fully described my invention, what I claim as new therein, and desire to secure by Letters Patent, is—

1. In the manufacture of beer, the improvement which consists in boiling the wort under pressure, after addition of hops, filtering and fermenting the boiled wort, filtering the fermented beer, subjecting the same to a pasteurizing temperature, aerating the pasteurized beer with ozonized air, charging the beer with carbonic acid, and storing the same, the operations being carried out under exclusion of atmospheric air.

2. In the manufacture of beer, the improvement which consists in boiling the wort under pressure after addition of hops, filtering and fermenting the boiled wort, filtering the fermented beer, subjecting the same to a pasteurizing temperature, aerating the pasteurized beer with ozonized air, charging the beer with carbonic acid and storing the same, the operations being carried out under exclusion of atmospheric air and the circulation of the beer during said operations being effected by sterilized air pressure.

3. The herein-described plant comprising a boiler, a filter, one or more fermenting vats, a second filter, a pasteurizing vessel and an aerating and cooling vessel, said elements connected in series, a compressed air main connected with the boiler, filters, fermenting vats and aerating and cooling vessel; in combination with an air sterilizing apparatus interposed in the air main in advance of its connections with the described elements, for the purpose set forth.

4. The herein-described plant, comprising a boiler, a filter, one or more fermenting vats, a second filter, a pasteurizing vessel and an aerating and cooling vessel, said elements connected in series, and a compressed air main connected with the boiler, filters, fermenting vats and aerating and cooling vessel; in combination with an air sterilizing apparatus interposed in the air main in advance of its connections with the described elements, a carbonic acid gas receiver connected with the pasteurizing vessel, means for returning the carbonic acid gas collected in the receiver into the circulation, and an ozonizing apparatus connected with the air main and aerating and cooling vessel respectively, for the purpose set forth.

5. The herein-described plant, comprising a boiler, a filter, one or more fermenting vats, a second filter a pasteurizing vessel and an aerating and cooling vessel, said elements connected in series, a receiver, a carbonic acid gas reservoir connected with the pasteurizing vessel, and pumps connecting the aerating and cooling vessel with the receiver and carbonic acid gas reservoir, respectively; in combination with a compressed air main connected with the boiler, filters, fermenting vats and aerating and cooling vessel respectively, an air sterilizing apparatus interposed in the air main in advance of its connection with said elements, and an ozonizer interposed in the branch connecting the air main with the aerating and cooling vessel, for the purpose set forth.

6. The herein-described plant, comprising a boiler, a filter, one or more fermenting vats, a second filter, a pasteurizing vessel and a cooling and aerating vessel, said elements connected in series, a carbonic acid reservoir connected with the pasteurizing vessel, and an auxiliary cooler, filter, mixing vat and bottling machine, also connected in series, and a pressure reservoir connected with said mixing vat; in combination with pumps connecting the cooling and aerating vessel with the auxiliary cooler and the carbonic acid reservoir with the pressure reservoir respectively, for the purpose set forth.

7. The herein-described plant, comprising a boiler, a filter, one or more fermenting vats, a second filter, a pasteurizing vessel, a cooling and aerating vessel, said elements connected in series, a carbonic acid reservoir connected with the pasteurizing vessel, and an auxiliary cooler, filter mixing vat and bottling machine, also connected in series, and a pressure reservoir connected with said mixing vessel; in combination with pumps connecting the cooling and aerating vessel with the auxiliary cooler, and the carbonic acid reservoir with the pressure reservoir, respectively, a compressed air main connected with the boiler, filter, fermenting vats and cooling and aerating vessels, an air sterilizing apparatus interposed in the air main in advance of its connections with said elements, and an ozonizing apparatus interposed in the connection between the air main and the cooling and aerating vessel, for the purpose set forth.

8. In a plant of the class described, a pasteurizer comprising a vessel having the form of an inverted truncated cone provided with an inlet for the liquid to be pasteurized at the lower narrower, and an out-let at the upper larger end thereof, perforated diaphragms interposed between the ends of said vessel, connected steam coils above and below said diaphragms and conforming to the configuration of the vessel, the initial of the coil at the upper end of the vessel connected with a source of steam supply whereby the liquid entering the vessel rises therein at a gradually decreasing velocity, the upward flow being further retarded by said diaphragms, while said liquid is subjected to a gradually increasing temperature.

9. In a plant of the class described, a pasteurizer, comprising a vessel having the form of an inverted truncated cone provided with an inlet for the liquid to be pasteurized at the lower narrower, and an outlet at the upper larger end thereof, perforated diaphragms interposed between the ends of said vessel, a layer of comminuted glass on one of the diaphragms, connected steam coils above and below said diaphragms and conforming to the configuration of the vessel, the initial of the coil at the upper end of the vessel connected with a source of steam supply whereby the liquid entering the vessel rises therein at a gradually decreasing velocity, the upward flow being further retarded by said diaphragms and layer of comminuted glass, while said liquid is subjected to a gradually increasing temperature.

10. In a plant of the class described, a pasteurizer comprising a vessel having the form of an inverted truncated cone provided with an inlet for the liquid to be pasteurized at the lower narrower, and an outlet at the upper larger end thereof, perforated diaphragms interposed between the ends of said vessel, a filtering medium interposed between the upper diaphragm and outlet, connected steam coils above and below said diaphragm and conforming to the configuration of the vessel, the initial coil at the upper end of the vessel connected with a source of steam supply whereby the liquid entering the vessel rises therein at a gradually decreasing velocity, the upward flow being further retarded by said diaphragm, while said liquid is subjected to a gradually increasing temperature.

11. In a plant of the class described, a pasteurizer comprising a vessel having the form of an inverted truncated cone, provided with an inlet for the liquid to be pasteurized at the lower, narrower end thereof, and an outlet at the upper, larger end thereof, and a cooler above said outlet, perforated diaphragms arranged within and dividing said vessel, connected steam coils above and below said diaphragms and conforming to the configuration of the vessel, the initial of the coil at the upper end of the vessel connected with a source of steam supply whereby the liquid entering the vessel is gradually heated to a pasteurizing temperature and then partially cooled before leaving the vessel.

12. In a plant of the class described, a conical jacketed cooling and aerating vessel, means for supplying the beer to the vessel at its narrower end and exhausting the same at its wider end, means for causing a cooling agent to circulate through the jacket in a reverse direction, and means for spraying a gaseous agent into the lower wider end of the vessel, for the purpose set forth.

13. In a plant of the class described, the combination with a pasteurizing apparatus, of a conical jacketed cooling and aerating vessel connected with the pasteurizer at its upper narrower end, an exhaust pipe at the lower wider end of said vessel, and means for supplying a cooling agent to the lower part of the jacket and exhausting the same from the upper part, in combination with a perforated air pipe arranged in the wider end of the vessel and an ozonizer interposed in the connection between said perforated pipe and the air supply pipe, for the purpose set forth.

In testimony that I claim the foregoing as my invention I have signed my name, in presence of two witnesses, this 15th day of June, 1892.

GUSTAV HERMANN SCHNEIDER.

Witnesses:
   ALEXANDER SPECHT,
   DIEDRICH PETERSEN.